US012565903B2

(12) United States Patent
Kubo

(10) Patent No.: US 12,565,903 B2
(45) Date of Patent: Mar. 3, 2026

(54) FLUID PRESSURE CONTROL DEVICE

(71) Applicant: KYB Corporation, Tokyo (JP)

(72) Inventor: Shunsuke Kubo, Gifu (JP)

(73) Assignee: KYB CORPORATION, Tokyo (JP)

( * ) Notice: Subject to any disclaimer, the term of this patent is extended or adjusted under 35 U.S.C. 154(b) by 144 days.

(21) Appl. No.: 18/681,702

(22) PCT Filed: Jul. 21, 2022

(86) PCT No.: PCT/JP2022/028304
§ 371 (c)(1),
(2) Date: Feb. 6, 2024

(87) PCT Pub. No.: WO2023/017719
PCT Pub. Date: Feb. 16, 2023

(65) Prior Publication Data

US 2024/0271640 A1 Aug. 15, 2024

(30) Foreign Application Priority Data

Aug. 10, 2021 (JP) ................................ 2021-130616

(51) Int. Cl.
*F15B 11/00* (2006.01)
*F15B 13/01* (2006.01)
*E02F 9/22* (2006.01)

(52) U.S. Cl.
CPC ............ *F15B 11/003* (2013.01); *F15B 13/01* (2013.01); *E02F 9/226* (2013.01); *E02F 9/2267* (2013.01); *F15B 2211/30505* (2013.01); *F15B 2211/30515* (2013.01); *F15B 2211/329* (2013.01)

(58) Field of Classification Search
None
See application file for complete search history.

(56) References Cited

U.S. PATENT DOCUMENTS 6,907,815 B2 * 6/2005 Kim ........................ F15B 13/01 91/445
8,356,546 B2 * 1/2013 Matsuo .................. F15B 13/01 91/461
2018/0282974 A1 * 10/2018 Kubo .................... F15B 11/003

FOREIGN PATENT DOCUMENTS

JP 2017-062010 A 3/2017

* cited by examiner

*Primary Examiner* — Michael Quandt
(74) *Attorney, Agent, or Firm* — Rabin & Berdo, P.C.

(57) ABSTRACT

A load holding mechanism includes a switching valve configured to switch an operation of an operation check valve, and a relief valve configured to open when pressure in a load-side pressure chamber reaches predetermined pressure, and the switching valve includes a drain chamber provided on an opposite side of a spring chamber with a spool interposed therebetween, a drain passage connected to the relief valve and connected to at least one of the drain chamber and the spring chamber, a pressure leading passage configured to connect the drain passage and a downstream side of the spool, and a check valve provided in the pressure leading passage and configured to allow only a flow of the working fluid from the drain passage to the downstream side of the spool.

3 Claims, 9 Drawing Sheets

FLUID PRESSURE CONTROL DEVICE

TECHNICAL FIELD

The present invention relates to a fluid pressure control device.

BACKGROUND ART

A fluid pressure control device described in JP 2017-62010 A includes a relief valve that is opened when pressure in a load-side pressure chamber of a cylinder reaches predetermined pressure, a relief discharge passage that guides a relief fluid discharged from the relief valve to a tank, and a drain passage that allows a drain chamber and a spring chamber of a switching valve to communicate with the relief discharge passage.

SUMMARY OF INVENTION

In the fluid pressure control device disclosed in JP 2017-62010 A, when the relief valve is opened while an operator is operating a lever to extend the cylinder, the relief fluid is discharged to the tank through the relief discharge passage and also flows into the drain chamber and the spring chamber through the drain passage, causing a spool of the switching valve to move in a closing direction, and the operator may not be able to obtain the desired extending speed of the cylinder. In such a case, when the operator operates the lever to increase pilot pressure acting on the spool in order to obtain the desired extending speed, the spool moves in an opening direction, a working fluid flows quickly into a downstream side of the spool, the pressure of which is reduced due to the movement of the spool in the closing direction, and thereby, the cylinder rapidly accelerates temporarily.

An object of the present invention is to provide a fluid pressure control device that prevents rapid acceleration of a cylinder.

According to one aspect of the present invention, a fluid pressure control device for controlling an extending and contracting operation of a cylinder that drives a load, the fluid pressure control device includes: a control valve configured to control supply of a working fluid from a fluid pressure supply source to the cylinder; a pilot control valve configured to control pilot pressure led from a pilot pressure supply source to the control valve; a main passage configured to connect the control valve and a load-side pressure chamber of the cylinder on which load pressure of the load acts when the control valve is at a neutral position; and a load holding mechanism provided in the main passage. The load holding mechanism includes: an operation check valve configured to allow a flow of the working fluid from the control valve to the load-side pressure chamber and to allow a flow of the working fluid from the load-side pressure chamber to the control valve in accordance with back pressure, a switching valve configured to operate in conjunction with the control valve by the pilot pressure led through the pilot control valve to switch an operation of the operation check valve, and a relief valve configured to open when pressure in the load-side pressure chamber reaches predetermined pressure. The switching valve includes: a pilot chamber configured to receive the pilot pressure through the pilot control valve, a spool configured to move in accordance with the pilot pressure in the pilot chamber, a spring chamber configured to accommodate a biasing member that biases the spool in a valve closing direction, a drain chamber provided on an opposite side of the spring chamber with the spool interposed therebetween, a drain passage connected to the relief valve and connected to at least one of the drain chamber and the spring chamber, a pressure leading passage configured to connect the drain passage and a downstream side of the spool, and a check valve provided in the pressure leading passage and configured to allow only a flow of the working fluid from the drain passage to the downstream side of the spool.

DESCRIPTION OF EMBODIMENTS

Figure 1:
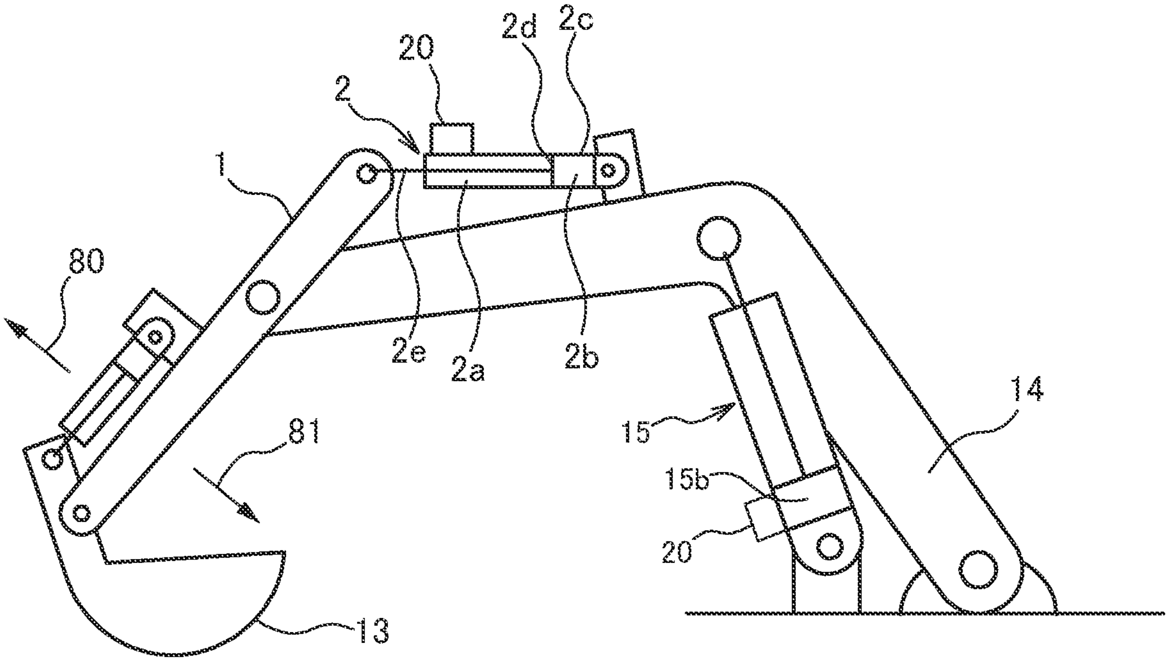
FIG. 1 is a diagram showing a part of a hydraulic shovel.

Hereinafter, a fluid pressure control device according to an embodiment of the present invention will be described with reference to the drawings.

The fluid pressure control device controls an operation of hydraulic working equipment such as a hydraulic shovel. In the present embodiment, a hydraulic control device 100 that controls an extending and contracting operation of a cylinder 2 that drives an arm (load) 1 of a hydraulic shovel shown in FIG. 1 will be described. Hereinafter, a case where working oil is used as a working fluid of the cylinder 2 will be described, but instead of the working oil, for example, a water-soluble substitute liquid or the like may be used.

First, a hydraulic circuit of the hydraulic control device 100 will be described with reference to FIG. 2.

The cylinder 2 includes a cylindrical cylinder tube 2*c*, a piston 2*d* that is slidably inserted into the cylinder tube 2*c* and partitions the inside of the cylinder tube 2*c* into a rod-side chamber 2*a* and a non-rod side chamber 2*b*, and a rod 2*e* having one end connected to the piston 2*d* and the other end extending to the outside of the cylinder tube 2*c* and connected to the arm 1.

The hydraulic shovel is equipped with a power source such as an engine or an electric motor, and the power drives a pump 4 as a fluid pressure supply source and a pilot pump 5 as a pilot pressure supply source.

The hydraulic control device 100 includes a control valve 6 that controls the supply of the working oil from the pump 4 to the cylinder 2, and a pilot control valve 9 that controls pilot pressure led from the pilot pump 5 to the control valve 6.

The control valve 6 and the rod-side chamber 2*a* of the cylinder 2 are connected by a first main passage 7, and the control valve 6 and the non-rod side chamber 2*b* of the cylinder 2 are connected by a second main passage 8.

The control valve 6 is operated by the pilot pressure led from the pilot pump 5 to pilot chambers 6*a* and 6*b* through the pilot control valve 9 when an operator of the hydraulic shovel manually operates an operation lever 10.

Specifically, when the pilot pressure is led to the pilot chamber 6*a*, the control valve 6 is switched to a position 6A, the working oil is supplied from the pump 4 to the rod-side chamber 2*a* through the first main passage 7, and the working oil in the non-rod side chamber 2*b* is discharged to a tank T through the second main passage 8. As a result, the cylinder 2 is contracted, and the arm 1 is raised in the direction of an arrow 80 shown in FIG. 1.

On the other hand, when the pilot pressure is led to the pilot chamber 6*b*, the control valve 6 is switched to a position 6B, the working oil is supplied from the pump 4 to the non-rod side chamber 2*b* through the second main passage 8, and the working oil in the rod-side chamber 2*a* is discharged to the tank T through the first main passage 7. As a result, the cylinder 2 is extended, and the arm 1 is lowered in the direction of an arrow 81 shown in FIG. 1.

When the pilot pressure is not led to the pilot chambers 6*a* and 6*b*, the control valve 6 is at a position 6C, the supply and discharge of the working oil to and from the cylinder 2 are blocked, and the arm 1 is maintained in a stopped state.

As described above, the control valve 6 has three positions including the contracting position 6A at which the cylinder 2 is contracted, the extending position 6B at which the cylinder 2 is extended, and the neutral position 6C at which the load of the cylinder 2 is maintained, switches the supply and discharge of the working oil to and from the cylinder 2, and controls the extending and contracting operation of the cylinder 2.

Here, as shown in FIG. 1, when the control valve 6 is switched to the neutral position 6C and the movement of the arm 1 is stopped in a state in which a bucket 13 is lifted, force in the direction of extending acts on the cylinder 2 due to weights of the bucket 13, the arm 1, and the like. As described above, in the cylinder 2 that drives the arm 1, the rod-side chamber 2*a* serves as a load-side pressure chamber on which load pressure acts when the control valve 6 is at the neutral position 6C.

A load holding mechanism 20 is provided in the first main passage 7 connected to the rod-side chamber 2*a* which is the load-side pressure chamber. The load holding mechanism 20 holds the load pressure in the rod-side chamber 2*a* when the control valve 6 is at the neutral position 6C, and is fixed to a surface of the cylinder 2 as shown in FIG. 1.

In a cylinder 15 that drives a boom 14 (see FIG. 1), since a non-rod side chamber 15*b* serves as a load-side pressure chamber, when the boom 14 is provided with the load holding mechanism 20, the load holding mechanism 20 is provided in a main passage connected to the non-rod side chamber 15*b*.

The load holding mechanism 20 includes an operation check valve 21 provided in the first main passage 7, and a switching valve 22 that operates in conjunction with the control valve 6 by the pilot pressure led through the pilot control valve 9 to switch an operation of the operation check valve 21.

The operation check valve 21 includes a valve body 24 that opens and closes the first main passage 7, a seat portion 28 on which the valve body 24 is seated, a back pressure chamber 25 facing a back surface of the valve body 24, and a passage 26 that is formed in the valve body 24 and normally leads the working oil of the rod-side chamber 2*a* to the back pressure chamber 25. The passage 26 is provided with a throttle 26*a* that gives resistance to the passing working oil.

The first main passage 7 includes a cylinder-side first main passage 7*a* connecting the rod-side chamber 2*a* and the operation check valve 21, and a control valve-side first main passage 7*b* connecting the operation check valve 21 and the control valve 6.

A first pressure receiving surface 24*a* on which pressure in the control valve-side first main passage 7*b* acts and a second pressure receiving surface 24*b* on which pressure in the rod-side chamber 2*a* acts through the cylinder-side first main passage 7*a* are formed in the valve body 24.

A spring 27 serving as a biasing member that biases the valve body 24 in a valve closing direction is accommodated in the back pressure chamber 25. Pressure in the back pressure chamber 25 and biasing force of the spring 27 act in a direction in which the valve body 24 is seated on the seat portion 28.

When the valve body 24 is seated on the seat portion 28, the operation check valve 21 functions as a check valve that blocks the flow of the working oil from the rod-side chamber 2*a* to the control valve 6. That is, the operation check valve 21 prevents leakage of the working oil in the rod-side chamber 2*a* to hold the load pressure, and maintains the arm 1 in the stopped state.

The switching valve 22 includes a pilot chamber 23 to which the pilot pressure is led through the pilot control valve 9, a spool 56 (see FIG. 3) that moves in accordance with the pilot pressure in the pilot chamber 23, a spring chamber 54 that accommodates a spring 36 serving as a biasing member that biases the spool 56 in the valve closing direction, a drain chamber 51 provided on an opposite side of the spring chamber 54 with the spool 56 interposed therebetween, and a drain passage 76 that connects the spring chamber 54 and the drain chamber 51 to the tank T.

A bypass passage 30 and a back pressure passage 31 are connected to an upstream side of the switching valve 22, and a downstream passage 38 is connected to a downstream side of the switching valve 22. The bypass passage 30 is a passage for leading the working oil in the rod-side chamber 2*a* to the control valve-side first main passage 7*b* while bypassing the operation check valve 21. The back pressure passage 31 is a passage for leading the working oil in the back pressure chamber 25 to the control valve-side first main passage 7*b*. The downstream passage 38 is a passage for leading the working oil from the bypass passage 30 and the back pressure passage 31 to the control valve-side first main passage 7*b*.

The switching valve 22 switches the communication between the bypass passage 30 and the back pressure passage 31 with respect to the downstream passage 38, and controls the flow of the working oil in the first main passage 7 on a meter-out side when the cylinder 2 is extended.

The switching valve 22 includes three ports including a first supply port 32 communicating with the bypass passage 30, a second supply port 33 communicating with the back pressure passage 31, and a discharge port 34 communicating with the downstream passage 38. The switching valve 22 has three positions including a blocking position 22A, a first communication position 22B, and a second communication position 22C.

When the pilot pressure is led to the pilot chamber 6*b* of the control valve 6, the pilot pressure is also led to the pilot chamber 23 at the same time. That is, when the control valve

6 is switched to the extending position 6B, the switching valve 22 is also switched to the first communication position 22B or the second communication position 22C.

Specifically, when the pilot pressure is not led to the pilot chamber 23, the switching valve 22 maintains the blocking position 22A by biasing force of the spring 36. At the blocking position 22A, both the first supply port 32 and the second supply port 33 are blocked.

When pilot pressure greater than or equal to first predetermined pressure and less than second predetermined pressure is led to the pilot chamber 23, the switching valve 22 is switched to the first communication position 22B. At the first communication position 22B, the first supply port 32 communicates with the discharge port 34. As a result, the working oil in the rod-side chamber 2*a* is led from the bypass passage 30 to the downstream passage 38 through the switching valve 22. That is, the working oil in the rod-side chamber 2*a* is led to the control valve-side first main passage 7*b* while bypassing the operation check valve 21. At this time, resistance is given to the flow of the working oil by the throttle 37. The second supply port 33 maintains a blocked state.

When pilot pressure greater than or equal to the second predetermined pressure is led to the pilot chamber 23, the switching valve 22 is switched to the second communication position 22C. At the second communication position 22C, the first supply port 32 communicates with the discharge port 34, and the second supply port 33 also communicates with the discharge port 34. As a result, the working oil in the back pressure chamber 25 is led from the back pressure passage 31 to the downstream passage 38 through the switching valve 22. At this time, the working oil in the back pressure chamber 25 is led to the control valve-side first main passage 7*b* while bypassing the throttle 37, and is discharged from the control valve 6 to the tank T. As a result, differential pressure is generated before and after the throttle 26*a*, and the pressure in the back pressure chamber 25 is reduced. Thus, force in the valve closing direction acting on the valve body 24 is reduced, the valve body 24 is separated from the seat portion 28, and the function of the operation check valve 21 as a check valve is canceled.

The load holding mechanism 20 includes a relief valve 41 that opens when the pressure in the rod-side chamber 2*a* reaches predetermined pressure to allow passage of the working oil and release the working oil in the rod-side chamber 2*a*. The relief valve 41 is provided in a relief passage 40 branched from the upstream side of the switching valve 22 in the bypass passage 30. Relief pressure oil discharged from the relief valve 41 is discharged to the tank T through the drain passage 76. The relief passage 40 may be provided branching off from the cylinder-side first main passage 7*a* or may be directly connected to the rod-side chamber 2*a*.

The drain passage 76 includes a first drain passage 76*a* connected to the drain chamber 51, a second drain passage 76*b* connected to the spring chamber 54, a third drain passage 76*c* connected to the relief valve 41, and a fourth drain passage 76*d* connecting the first drain passage 76*a*, the second drain passage 76*b*, and the third drain passage 76*c*. The first drain passage 76*a* and the second drain passage 76*b* are provided in direct communication with each other.

The drain chamber 51 communicates with the third drain passage 76*c* downstream of the relief valve 41 through the first drain passage 76*a* and the fourth drain passage 76*d*. The spring chamber 54 communicates with the third drain passage 76*c* downstream of the relief valve 41 through the second drain passage 76*b* and the fourth drain passage 76*d*. The third drain passage 76*c* communicates with a drain port 86 that opens on an outer surface of a body 60 (see FIG. 3) of the load holding mechanism 20. The drain port 86 is connected to the tank T through a pipe 55 (see FIG. 2). As described above, the relief pressure oil discharged from the relief valve 41 and the drain of the drain chamber 51 and the spring chamber 54 are discharged to the tank T through the drain port 86 and the pipe 55. Since both the drain chamber 51 and the spring chamber 54 respectively provided on two sides of the spool 56 of the switching valve 22 communicate with the tank T, when the switching valve 22 is at the blocking position 22A, atmospheric pressure acts on both ends of the spool 56, preventing the spool 56 from moving unexpectedly.

A relief valve 43 that opens when the pressure in the control valve-side first main passage 7*b* reaches predetermined pressure is connected to the control valve-side first main passage 7*b*.

Next, the switching valve 22 will be described in detail mainly with reference to FIG. 3. FIG. 3 is a cross-sectional view of the load holding mechanism 20, and shows a state in which the pilot pressure is not led to the pilot chamber 23 and the switching valve 22 is at the blocking position 22A. In FIG. 3, components denoted by the same reference numerals as those in FIG. 2 have the same configurations as those in FIG. 2.

The switching valve 22 is assembled into the body 60 of the load holding mechanism 20. A spool hole 60*a* is formed in the body 60, and a substantially cylindrical sleeve 61 is inserted into the spool hole 60*a*. The spool 56 is slidably assembled into the sleeve 61.

The spring chamber 54 is partitioned by a cap 57 on the side of one end surface 56*a* of the spool 56. The spring chamber 54 is connected to the second drain passage 76*b* through a cutout 61*a* formed in an end surface of the sleeve 61. The working oil that leaks into the spring chamber 54 is discharged from the second drain passage 76*b* to the tank T.

The spring chamber 54 accommodates an annular first spring receiving member 45 in which an end surface thereof abuts the one end surface 56*a* of the spool 56 and a pin portion 56*c* formed to protrude from the one end surface 56*a* of the spool 56 is inserted into a hollow portion of the first spring receiving member 45, and a second spring receiving member 46 disposed near a bottom portion of the cap 57. The spring 36 is interposed in a compressed state between the first spring receiving member 45 and the second spring receiving member 46, and biases the spool 56 in the valve closing direction via the first spring receiving member 45.

An axial position of the second spring receiving member 46 in the spring chamber 54 is set by abutting a tip portion of an adjustment bolt 47 passing through the bottom portion of the cap 57 to be screwed with a back surface of the second spring receiving member 46. By screwing the adjustment bolt 47, the second spring receiving member 46 moves in a direction in which the second spring receiving member 46 comes close to the first spring receiving member 45. Therefore, by adjusting a screwing amount of the adjustment bolt 47, an initial spring load of the spring 36 can be adjusted. The adjustment bolt 47 is fixed by a nut 48.

The pilot chamber 23 is partitioned on the side of the other end surface 56*b* of the spool 56. The pilot chamber 23 is partitioned by a piston hole 60*b* formed to communicate with the spool hole 60*a* and a cap 58 that closes the piston hole 60*b*. The pilot pressure is led to the pilot chamber 23 through a pilot passage 52 formed in the body 60. In the pilot chamber 23, a piston 50 that receives the pilot pressure on a back surface thereof and gives thrust force against the biasing force of the spring 36 to the spool 56 is slidably accommodated.

The drain chamber 51 is partitioned in the piston hole 60*b* by the spool 56 and the piston 50. The drain chamber 51 is connected to the first drain passage 76*a*. The working oil that leaks into the drain chamber 51 is discharged from the first drain passage 76*a* to the tank T.

The piston 50 includes a sliding portion 50*a* whose outer peripheral surface slides along an inner peripheral surface of the piston hole 60*b*, a tip portion 50*b* formed to have a smaller diameter than the sliding portion 50*a* and facing the other end surface 56*b* of the spool 56, and a base portion 50*c* formed to have a smaller diameter than the sliding portion 50*a* and facing a tip surface of the cap 58.

When pilot pressure oil is supplied into the pilot chamber 23 through the pilot passage 52, the pilot pressure acts on a back surface of the base portion 50*c* and an annular back surface of the sliding portion 50*a*. As a result, the piston 50 moves forward, and the tip portion 50*b* abuts the other end surface 56*b* of the spool 56 to move the spool 56. Thus, the spool 56 receives thrust force of the piston 50 generated based on the pilot pressure acting on a back surface of the piston 50, and moves against the biasing force of the spring 36. Even when the back surface of the base portion 50*c* abuts the tip surface of the cap 58, the piston 50 can move forward since the base portion 50*c* has a smaller diameter than the sliding portion 50*a*, and the pilot pressure acts on the annular back surface of the sliding portion 50*a*.

Since one end of the piston 50 faces the pilot chamber 23 and the other end faces the drain chamber 51 connected to the tank T, the thrust force of the piston 50 generated based on the pilot pressure in the pilot chamber 23 is efficiently transmitted to the spool 56.

The spool 56 stops at a position where the biasing force of the spring 36 acting on the one end surface 56*a* and the thrust force of the piston 50 acting on the other end surface 56*b* are balanced, and a switching position of the switching valve 22 is set at the stop position of the spool 56.

Figure 2:
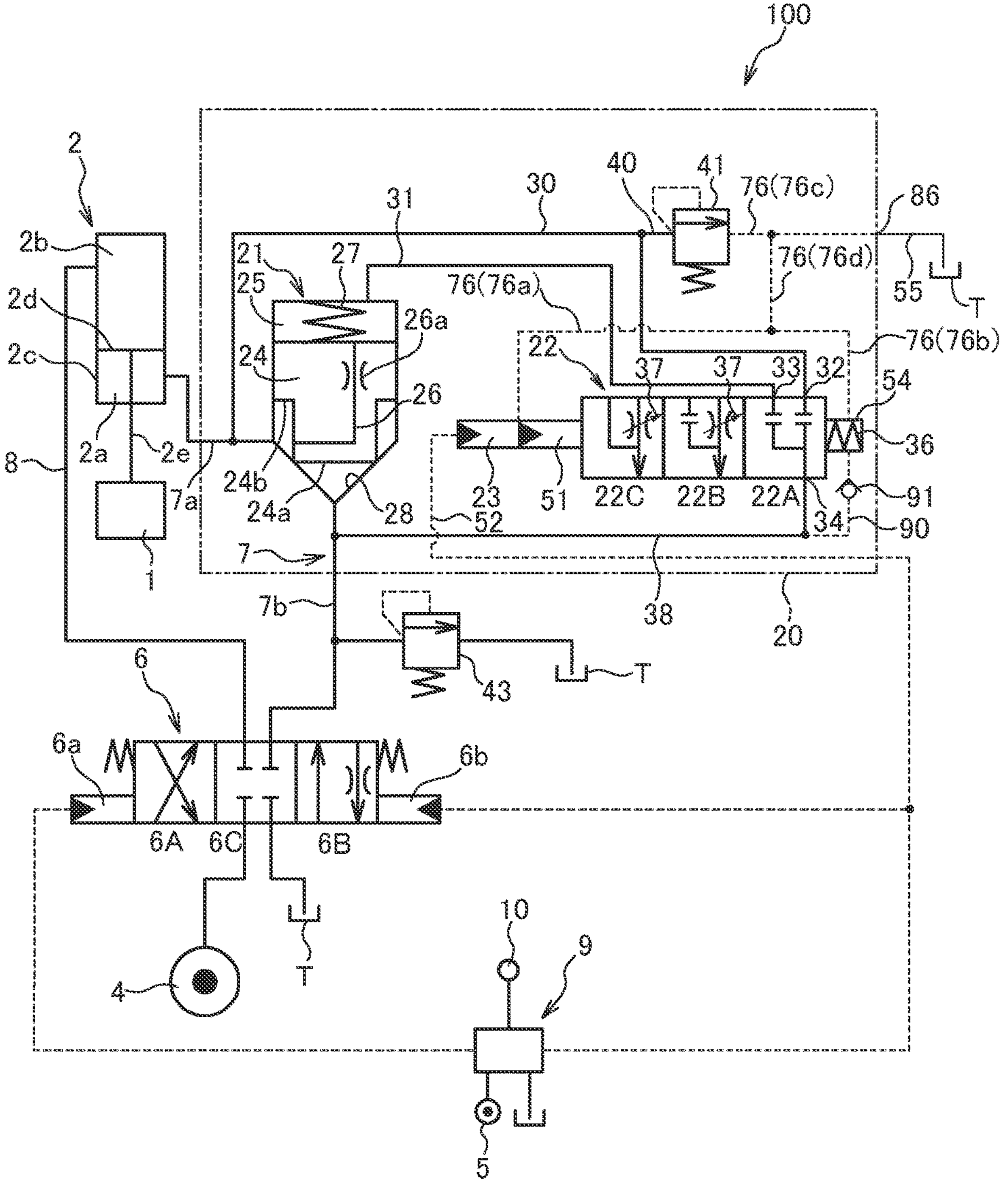
FIG. 2 is a fluid pressure circuit diagram of a fluid pressure control device according to an embodiment of the present invention.
Figure 3:
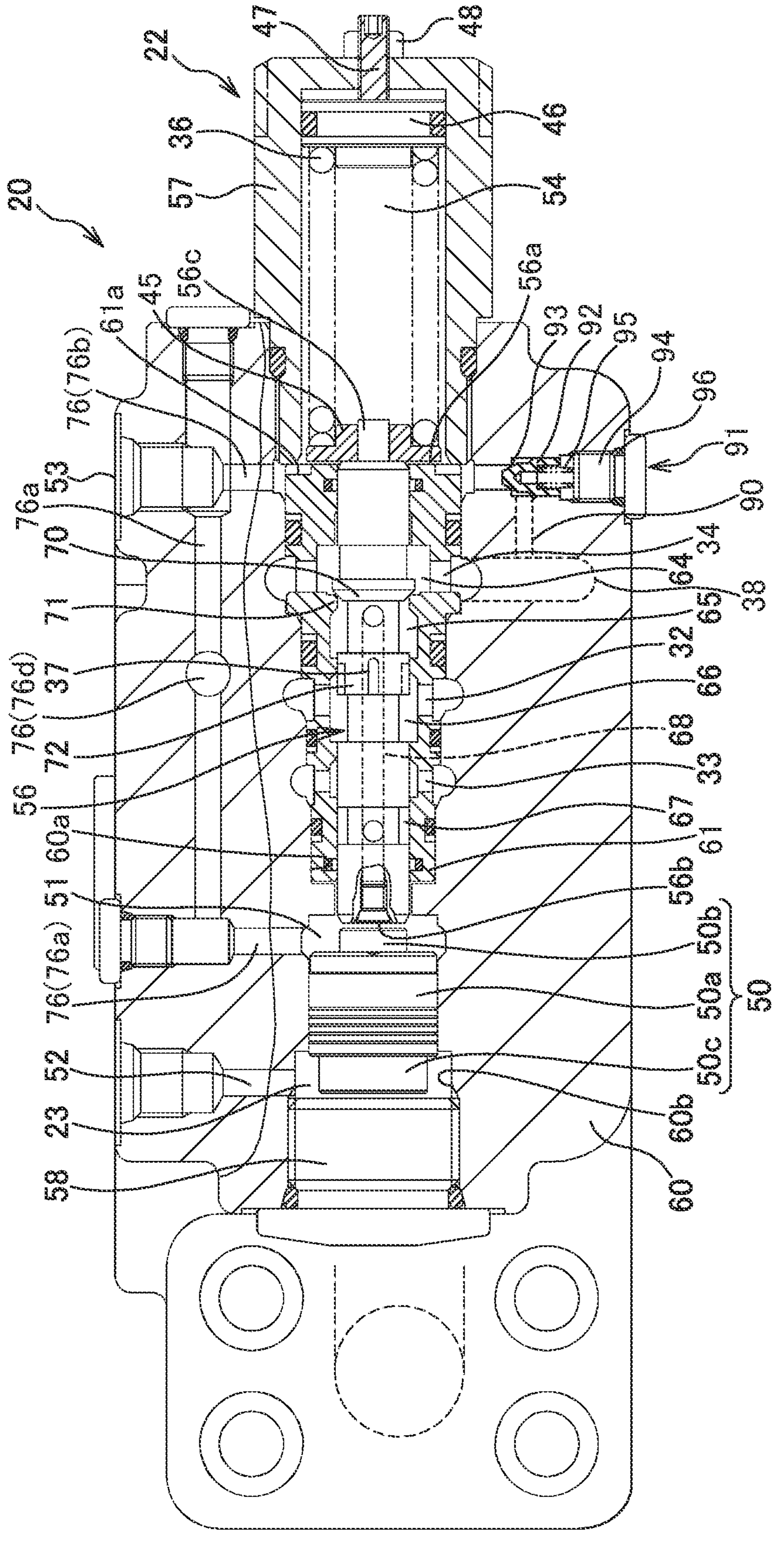
FIG. 3 is a cross-sectional view of a load holding mechanism of the fluid pressure control device according to the embodiment of the present invention.

The sleeve 61 is formed with three ports including the first supply port 32 communicating with the bypass passage 30 (see FIG. 2), the second supply port 33 communicating with the back pressure passage 31 (see FIG. 2), and the discharge port 34 communicating with the downstream passage 38 (see FIG. 2).

An outer peripheral surface of the spool 56 is partially cut out into an annular shape, and the cut-out portion and an inner peripheral surface of the sleeve 61 form a first pressure chamber 64, a second pressure chamber 65, a third pressure chamber 66, and a fourth pressure chamber 67. The first pressure chamber 64 normally communicates with the discharge port 34.

The third pressure chamber 66 normally communicates with the first supply port 32. The plurality of throttles 37 that provides communication between the third pressure chamber 66 and the second pressure chamber 65 by moving the spool 56 against the biasing force of the spring 36 is formed on an outer peripheral surface of a land portion 72 of the spool 56.

The fourth pressure chamber 67 normally communicates with the second pressure chamber 65 through a pressure leading passage 68 axially formed in the spool 56.

When the pilot pressure is not led to the pilot chamber 23, a poppet valve 70 formed in the spool 56 is pressed onto a valve seat 71 formed on an inner periphery of the sleeve 61 by the biasing force of the spring 36, and the communication between the second pressure chamber 65 and the first pressure chamber 64 is blocked. Therefore, the communication between the first supply port 32 and the discharge port 34 is blocked. Thus, the working oil in the rod-side chamber 2*a* does not leak out to the discharge port 34. This state corresponds to the blocking position 22A of the switching valve 22. In a state in which the poppet valve 70 is seated on the valve seat 71 by the biasing force of the spring 36, since a slight gap exists between an end surface of the first spring receiving member 45 and the end surface of the sleeve 61, the poppet valve 70 is reliably seated on the valve seat 71 by the biasing force of the spring 36.

When the pilot pressure is led to the pilot chamber 23 and the thrust force of the piston 50 acting on the spool 56 is greater than the biasing force of the spring 36, the spool 56 moves against the biasing force of the spring 36. Thus, when the poppet valve 70 is separated from the valve seat 71, the third pressure chamber 66 and the second pressure chamber 65 communicate with each other through the plurality of throttles 37, and thus the first supply port 32 communicates with the discharge port 34 through the third pressure chamber 66, the second pressure chamber 65, and the first pressure chamber 64. Due to the communication between the first supply port 32 and the discharge port 34, the working oil in the rod-side chamber 2*a* is led to the downstream passage 38 (see FIG. 2) through the throttles 37. This state corresponds to the first communication position 22B of the switching valve 22.

When the pilot pressure led to the pilot chamber 23 increases, the spool 56 further moves against the biasing force of the spring 36, and the fourth pressure chamber 67 communicates with the second supply port 33. Thus, the second supply port 33 communicates with the discharge port 34 through the fourth pressure chamber 67, the pressure leading passage 68, the second pressure chamber 65, and the first pressure chamber 64. Due to the communication between the second supply port 33 and the discharge port 34, the working oil in the back pressure chamber 25 is led to the downstream passage 38 while bypassing the throttles 37 (see FIG. 2). This state corresponds to the second communication position 22C of the switching valve 22.

Next, an operation of the hydraulic control device 100 will be described with reference to FIGS. 2 and 3.

When the control valve 6 is at the neutral position 6C, the working oil discharged by the pump 4 is not supplied to the cylinder 2. At this time, since the pilot pressure is not led to the pilot chamber 23 of the switching valve 22, the switching valve 22 is at the blocking position 22A.

Therefore, the back pressure chamber 25 of the operation check valve 21 is maintained at the pressure in the rod-side chamber 2*a*. Here, since a pressure receiving area of the valve body 24 in the valve closing direction (an area of the back surface of the valve body 24) is larger than an area of the second pressure receiving surface 24*b*, which is a pressure receiving area in a valve opening direction, the valve body 24 is seated on the seat portion 28 by the load acting on the back surface of the valve body 24 due to the pressure in the back pressure chamber 25 and the biasing force of the spring 27. Thus, the operation check valve 21 prevents the leakage of the working oil in the rod-side chamber 2*a*, and the arm 1 is maintained in the stopped state.

When the operation lever 10 is operated and the pilot pressure is led from the pilot control valve 9 to the pilot chamber 6*a* of the control valve 6, the control valve 6 is switched to the contracting position 6A by an amount in accordance with the pilot pressure. When the control valve 6 is switched to the contracting position 6A, discharge pressure in the pump 4 acts on the first pressure receiving surface 24*a* of the operation check valve 21. At this time, since the pilot pressure is not led to the pilot chamber 23 and the switching valve 22 is at the blocking position 22A, the back pressure chamber 25 of the operation check valve 21 is maintained at the pressure in the rod-side chamber 2*a*. When the load acting on the first pressure receiving surface 24*a* is greater than total load of the load acting on the back surface of the valve body 24 due to the pressure in the back pressure chamber 25 and the biasing force of the spring 27, the valve body 24 is separated from the seat portion 28. When the operation check valve 21 is opened in this manner, the working oil discharged from the pump 4 is supplied to the rod-side chamber 2*a*, and the cylinder 2 is contracted. Thus, the arm 1 is raised in the direction of the arrow 80 shown in FIG. 1.

When the operation lever 10 is operated and the pilot pressure is led from the pilot control valve 9 to the pilot chamber 6*b* of the control valve 6, the control valve 6 is switched to the extending position 6B by an amount in accordance with the pilot pressure. At the same time, since the pilot pressure is also led to the pilot chamber 23, the switching valve 22 is switched to the first communication position 22B or the second communication position 22C according to the supplied pilot pressure.

When the pilot pressure led to the pilot chamber 23 is greater than or equal to the first predetermined pressure and less than the second predetermined pressure, the switching valve 22 is switched to the first communication position 22B. In this case, since the communication between the second supply port 33 and the discharge port 34 is blocked, the back pressure chamber 25 of the operation check valve 21 is maintained at the pressure in the rod-side chamber 2*a*, and the operation check valve 21 is maintained in a closed state.

On the other hand, since the first supply port 32 communicates with the discharge port 34, the working oil in the rod-side chamber 2*a* is led from the bypass passage 30 to the downstream passage 38 through the throttles 37, and is discharged from the control valve-side first main passage 7*b* to the tank T through the control valve 6. Since the working oil discharged from the pump 4 is supplied to the non-rod side chamber 2*b*, the cylinder 2 is extended. Thus, the arm 1 is lowered in the direction of the arrow 81 shown in FIG. 1.

Here, the switching valve 22 is switched to the first communication position 22B mainly when performing crane work to lower an object to be conveyed attached to the bucket 13 to a target position. In the crane work, since it is necessary to slowly lower the arm 1 in the direction of the arrow 81 by extending the cylinder 2 at a low speed, the pilot pressure led to the pilot chamber 6*b* of the control valve 6 is small, and the control valve 6 is only switched to the extending position 6B to a slight extent. Therefore, the pilot pressure led to the pilot chamber 23 of the switching valve 22 is also small and is greater than or equal to the first predetermined pressure and less than the second predetermined pressure, and the switching valve 22 is switched to only the first communication position 22B. Therefore, the working oil in the rod-side chamber 2*a* is discharged through the throttles 37, and the arm 1 is lowered at a low speed suitable for the crane work.

When the switching valve 22 is at the first communication position 22B, even if the control valve-side first main passage 7*b* bursts or the like and the working oil leaks out to the outside, a flow rate of the working oil discharged from the rod-side chamber 2*a* is restricted by the throttles 37, and thus a falling speed of the bucket 13 is reduced. This function is called metering control. Therefore, the switching valve 22 can be switched to the blocking position 22A before the bucket 13 falls on the ground, and the bucket 13 can be prevented from falling suddenly.

Thus, the throttles 37 are provided to reduce a lowering speed of the cylinder 2 when the operation check valve 21 is closed and to reduce the falling speed of the bucket 13 when the control valve-side first main passage 7*b* bursts.

When the pilot pressure led to the pilot chamber 23 is greater than or equal to the second predetermined pressure, the switching valve 22 is switched to the second communication position 22C. In this case, since the second supply port 33 communicates with the discharge port 34, the working oil in the back pressure chamber 25 of the operation check valve 21 is led from the back pressure passage 31 to the downstream passage 38 while bypassing the throttles 37, and is discharged from the control valve-side first main passage 7*b* to the tank T through the control valve 6. As a result, the differential pressure is generated before and after the throttle 26*a*, and the pressure in the back pressure chamber 25 is reduced. Thus, the force in the valve closing direction acting on the valve body 24 is reduced, the valve body 24 is separated from the seat portion 28, and the function of the operation check valve 21 as a check valve is canceled.

Thus, the operation check valve 21 operates to allow the flow of the working oil from the control valve 6 to the rod-side chamber 2*a* and to allow the flow of the working oil from the rod-side chamber 2*a* to the control valve 6 in accordance with the back pressure which is the pressure in the back pressure chamber 25.

When the operation check valve 21 is opened, the working oil in the rod-side chamber 2*a* is discharged to the tank T through the first main passage 7. Thus, the cylinder 2 is quickly extended. That is, when the switching valve 22 is switched to the second communication position 22C, the flow rate of the working oil discharged from the rod-side chamber 2*a* increases. Thus, a flow rate of the working oil supplied to the non-rod side chamber 2*b* increases, and the extending speed of the cylinder 2 increases. As a result, the arm 1 is quickly lowered in the direction of the arrow 81.

The switching valve 22 is switched to the second communication position 22C when performing excavating work or the like, the pilot pressure led to the pilot chamber 6*b* of the control valve 6 is large, and the control valve 6 is switched to the extending position 6B to a great extent. Therefore, since the pilot pressure led to the pilot chamber 23 of the switching valve 22 is also large and is greater than or equal to the second predetermined pressure, the switching valve 22 is switched to the second communication position 22C.

Here, in a state in which the operator operates the operation lever 10 to lead the pilot pressure to the pilot chamber 23 and move the spool 56 in the opening direction such that the cylinder 2 is extended, when the pressure in the rod-side chamber 2*a* increases and the relief valve 41 opens, the relief pressure oil discharged from the relief valve 41 is discharged to the tank T through the third drain passage 76*c*, and is also led to the drain chamber 51 and the spring chamber 54 through the first drain passage 76*a* and the second drain passage 76*b*. The relief pressure oil being led to the drain chamber 51 may cause the piston 50 to move in a direction away from the spool 56. In this case, since the thrust force of the piston 50 generated by the pilot pressure is not transmitted to the spool 56, the spool 56 moves in the closing direction by the biasing force of the spring 36. As a result, even though the pilot pressure is led to the pilot chamber 6*b* and the pilot chamber 23 by the operator operating the operation lever 10, the desired extending speed of the cylinder 2 by the operator cannot be obtained.

On the other hand, even if the spool 56 moves in the closing direction, the pilot pressure is led to the pilot chamber 6*b* of the control valve 6. Thus, the downstream passage 38 and the control valve-side first main passage 7*b* on a downstream side of the spool 56 communicate with the tank T through the control valve 6. Therefore, the working oil inside the downstream passage 38 and the control valve-side first main passage 7*b* is discharged to the tank T, and the pressure in the downstream passage 38 and the control valve-side first main passage 7*b* decreases. When the working oil in the downstream passage 38 and the control valve-side first main passage 7*b* flows into the tank T by a weight thereof, pressure in the downstream passage 38 and the control valve-side first main passage 7*b* may be negative.

In such a situation, when the operator operates the operation lever 10 to increase the pilot pressure acting on the spool 56 in order to obtain the desired extending speed, the spool 56 moves in the opening direction again. At this time, the working oil flows quickly into the downstream passage 38 and the control valve-side first main passage 7*b* on the downstream side of the spool 56, the pressure of which is reduced due to the movement of the spool 56 in the closing direction, and thereby, the cylinder 2 rapidly accelerates temporarily in an extending direction.

As a countermeasure for this, in the present embodiment, as shown in FIGS. 2 and 3, the switching valve 22 includes a pressure leading passage 90 that connects the drain passage 76 and the downstream side of the spool 56, and a check valve 91 that is provided in the pressure leading passage 90 and allows only a flow of the working oil from the drain passage 76 to the downstream side of the spool 56. Details will be described below.

In the present embodiment, the pressure leading passage 90 has one end connected to the second drain passage 76*b* via the spring chamber 54 and the other end connected to the downstream passage 38. The one end of the pressure leading passages 90 is connected to the spring chamber 54 through the cutout 61*a* formed in the end surface of the sleeve 61. The one end of the pressure leading passage 90 is not limited to being connected to the second drain passage 76*b* via the spring chamber 54, and may be directly connected to the second drain passage 76*b* without the spring chamber 54 interposed therebetween, or may be connected to the first drain passage 76*a*, the third drain passage 76*c*, or the fourth drain passage 76*d*. The other end of the pressure leading passage 90 may be connected to the downstream side of the spool 56, and may be connected to the control valve-side first main passage 7*b*.

As shown in FIG. 3, the check valve 91 includes a poppet valve 92 movably accommodated in the pressure leading passage 90, a valve seat 93 formed in the pressure leading passage 90, a plug 94 that seals an opening of the pressure leading passage 90 that opens to the outer surface of the body 60, a spring 95 serving as a biasing member that is compressed and accommodated between the poppet valve 92 and the plug 9 and biases the poppet valve 92 toward the valve seat 93, and an annular seal member 96 provided on an outer peripheral surface of the plug 94.

When pressure in the drain passage 76 is greater than pressure in the downstream passage 38, the poppet valve 92 moves against biasing force of the spring 95 and opens. Thus, a flow of the working oil from the drain passage 76 to the downstream passage 38 through the pressure leading passage 90 is allowed. On the other hand, when the pressure in the downstream passage 38 is greater than the pressure in the drain passage 76, the poppet valve 92 is seated on the valve seat 93 and closed by the biasing force of the spring 95. Thus, a flow of the working oil from the downstream passage 38 to the drain passage 76 through the pressure leading passage 90 is blocked. The check valve 91 is not limited to the poppet type, and may be a ball type, or may be an operation check valve that opens using the pressure on the upstream side as the pilot pressure.

Since the switching valve 22 includes the pressure leading passage 90 and the check valve 91, the following effects are achieved.

In a state in which the operator operates the operation lever 10 to lead the pilot pressure to the pilot chamber 23 and move the spool 56 in the opening direction such that the cylinder 2 is extended, when the pressure in the rod-side chamber 2*a* increases and the relief valve 41 opens, the spool 56 moves in the closing direction as described above. At this time, since the downstream passage 38 on the downstream side of the spool 56 communicates with the tank T through the control valve 6, the pressure decreases. When the pressure in the drain passage 76 is greater than the pressure in the downstream passage 38, the check valve 91 opens, and the working oil is led from the drain passage 76 to the downstream passage 38 through the pressure leading passage 90. Thus, the pressure in the drain passage 76 decreases, and the pressure in the drain chamber 51 and the spring chamber 54 also decreases. In addition, the working oil is led from the drain passage 76 to the downstream side of the spool 56 through the pressure leading passage 90. Thus, a pressure drop in the downstream passage 38 and the control valve-side first main passage 7*b* is prevented.

Therefore, in a case where the spool 56 moves in the closing direction, when the operator operates the operation lever 10 to increase the pilot pressure acting on the spool 56 in order to obtain the desired extending speed, the spool 56 smoothly moves in the opening direction due to a pressure drop of the drain chamber 51 and the spring chamber 54. Thus, the desired extending speed by the operator can be quickly obtained. In addition, the pressure drop in the downstream passage 38 and the control valve-side first main passage 7*b* is prevented. Thus, when the spool 56 moves in the opening direction, the working oil is prevented from flowing quickly to the downstream side of the spool 56, and the cylinder 2 is prevented from rapidly accelerates temporarily in the extending direction. Further, the pressure drop in the downstream passage 38 and the control valve-side first main passage 7*b* is prevented, the downstream passage 38 and the control valve-side first main passage 7*b* are prevented from becoming negative pressure, and cavitation is prevented. Thus, the responsiveness when operating the operation lever 10 is improved.

According to the above first embodiment, the following effects are achieved.

Since the check valve 91 that allows only the flow of the working oil from the drain passage 76 to the downstream side of the spool 56 is provided in the pressure leading passage 90 that connects the drain passage 76 and the downstream side of the spool 56, the relief pressure oil is led to the downstream side of the spool 56 through the pressure leading passage 90 even when the relief valve 41 is opened while the operator is performing a lever operation to extend the cylinder 2. Thus, the pressure in the drain passage 76 decreases, and the pressure in the drain chamber 51 and the spring chamber 54 also decreases. In addition, a pressure drop on the downstream side of the spool 56 is prevented. Therefore, when the relief valve 41 is opened and the spool 56 is moved in the closing direction, even if the operator operates the operation lever 10 to increase the pilot pressure acting on the spool 56 in order to obtain the desired extending speed, rapid acceleration of the cylinder 2 can be prevented.

Hereinafter, modifications of the above embodiment will be described. The following modifications are also within the scope of the present invention, and it is also possible to combine the following modifications and the configurations of the above embodiment, or to combine the following modifications.

Figure 4:
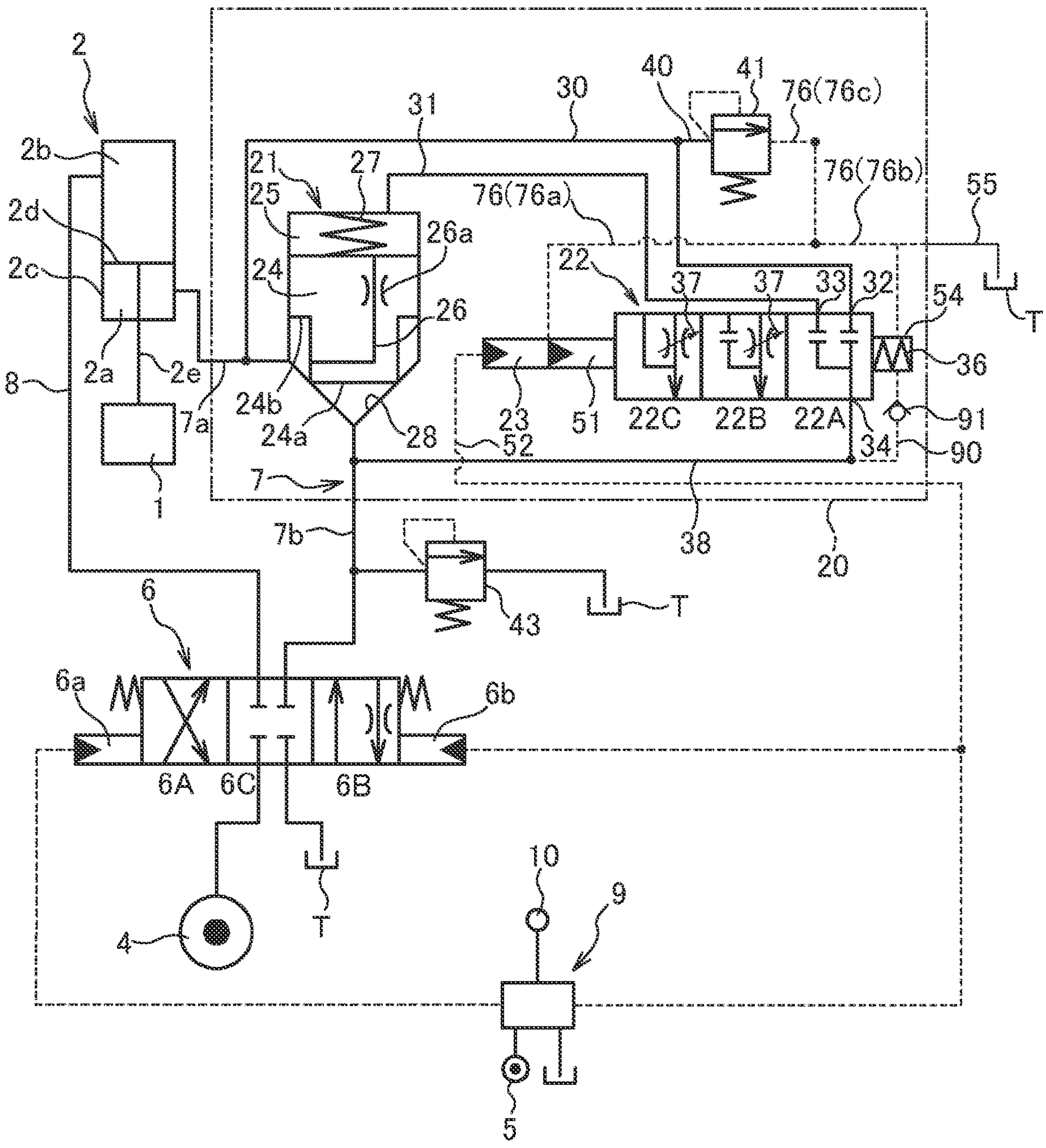
FIG. 4 is a fluid pressure circuit diagram showing a modification of a drain passage.
Figure 5:
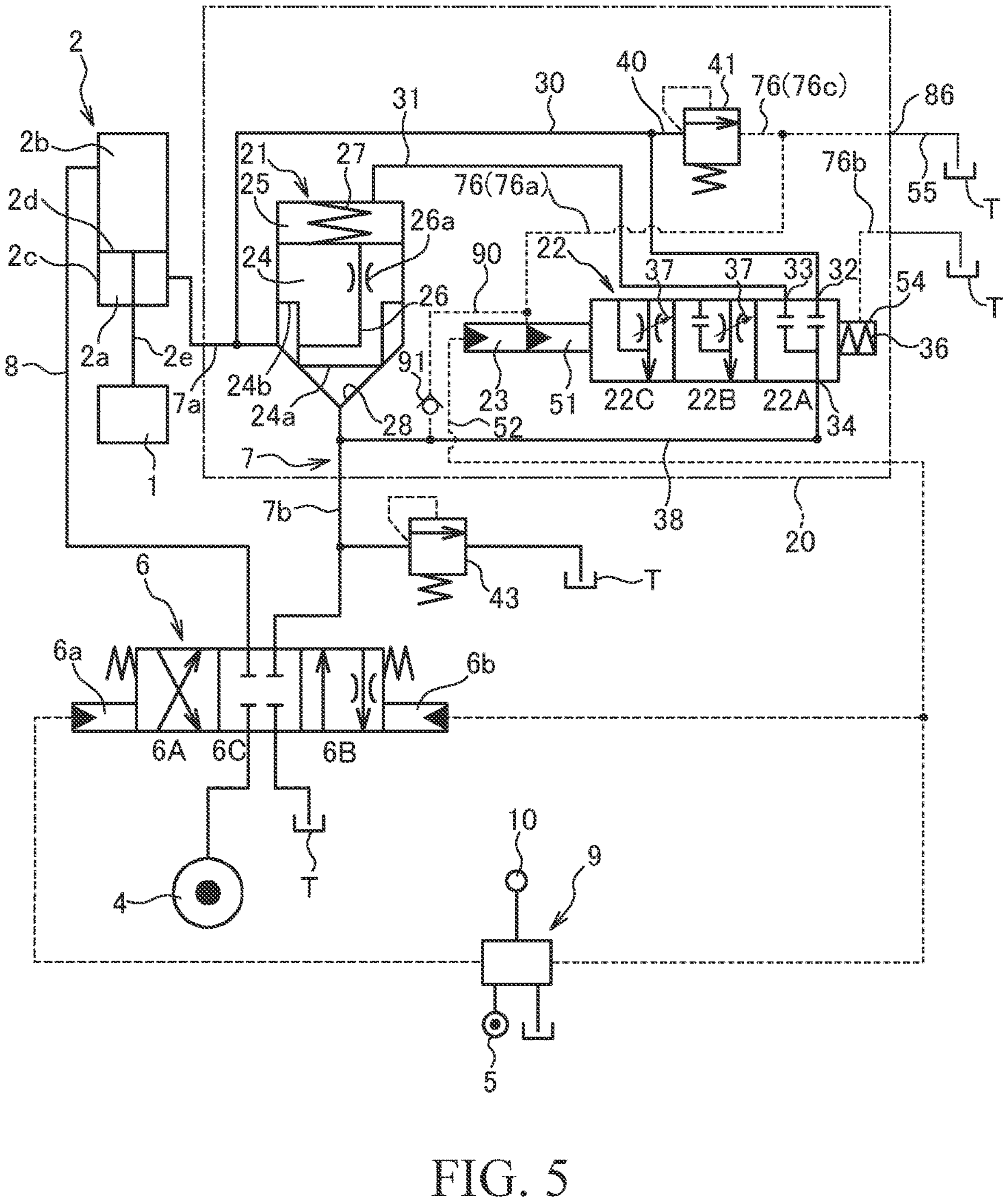
FIG. 5 is a fluid pressure circuit diagram showing a modification of the drain passage.
Figure 6:
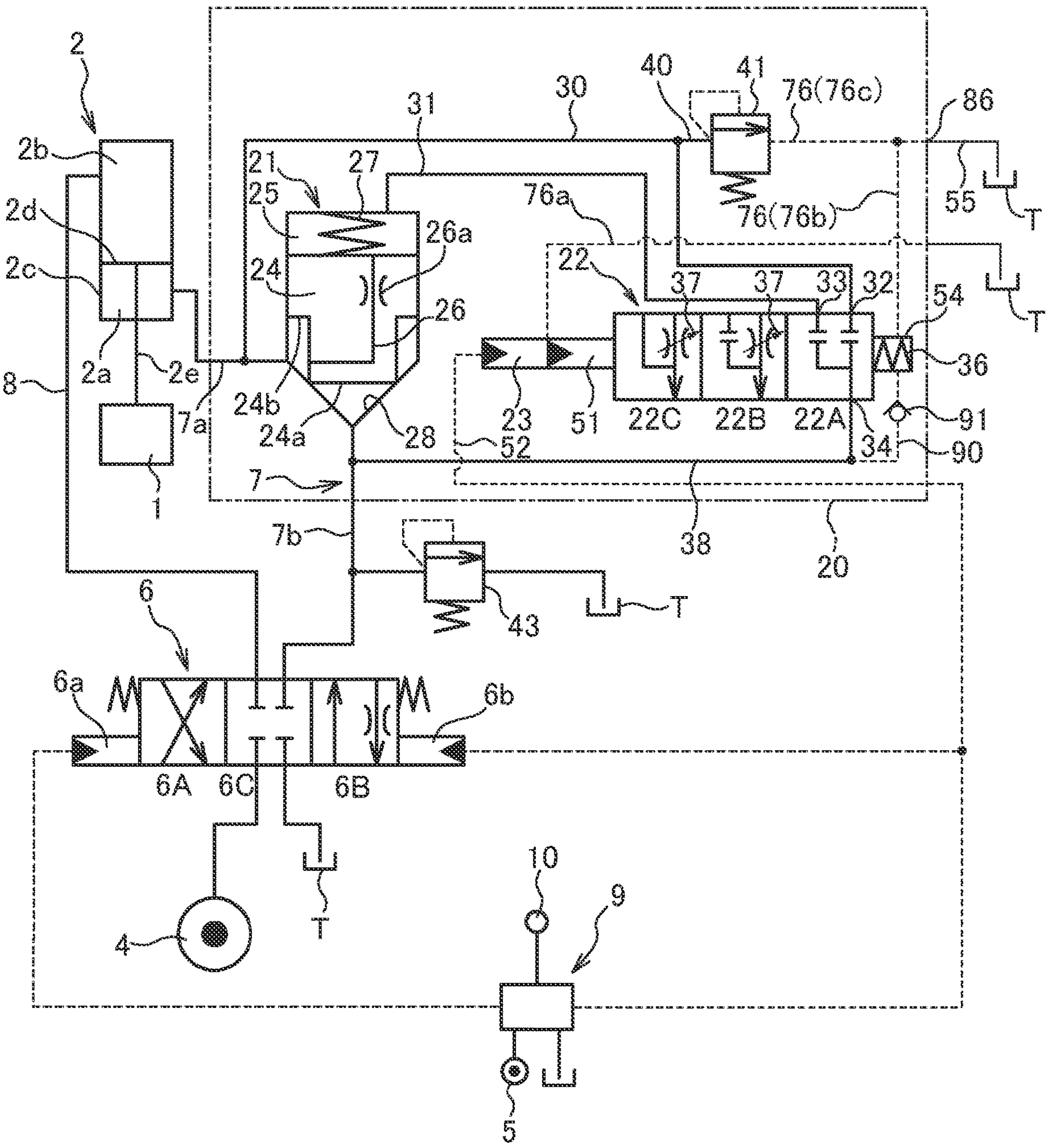
FIG. 6 is a fluid pressure circuit diagram showing a modification of the drain passage.

(1) The drain passage 76 is not limited to the configuration of the above embodiment. For example, as shown in FIG. 4, the fourth drain passage 76*d* may not be provided, and the first drain passage 76*a* and the second drain passage 76*b* may be directly connected to the third drain passage 76*c*. As shown in FIG. 5, the first drain passage 76*a* and the third drain passage 76*c* may be connected, and the second drain passage 76*b* may be independently provided. In this configuration, the pressure leading passage 90 is connected to the drain passage 76 including the first drain passage 76*a* and the third drain passage 76*c*. As shown in FIG. 6, the second drain passage 76*b* and the third drain passage 76*c* may be connected, and the first drain passage 76*a* may be independently provided. In this configuration, the pressure leading passage 90 is connected to the drain passage 76 including the second drain passage 76*b* and the third drain passage 76*c*. That is, the pressure leading passage 90 is connected to the relief valve 41 and is connected to the drain passage 76 connected to at least one of the drain chamber 51 and the spring chamber 54.

Figure 7:
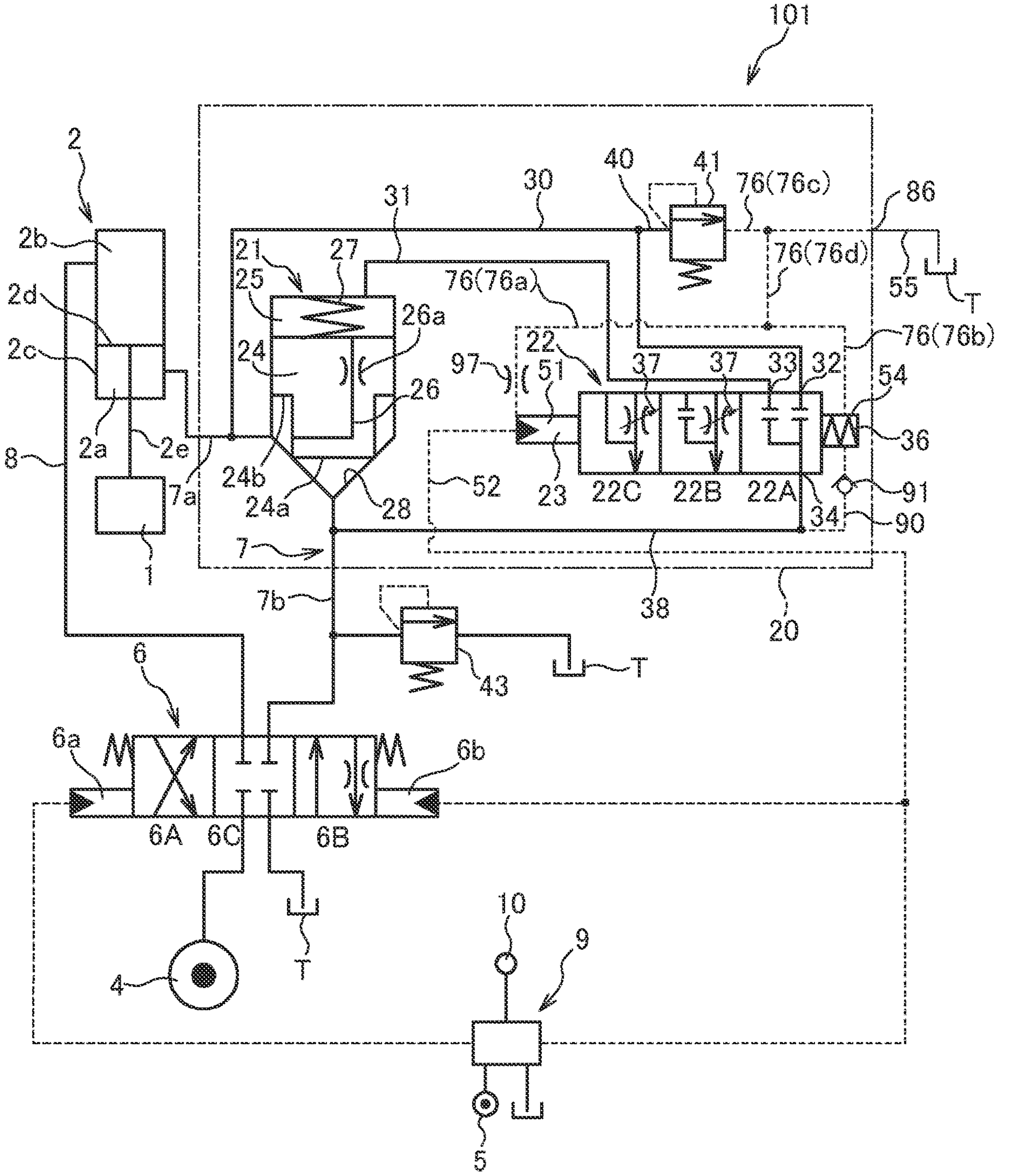
FIG. 7 is a fluid pressure circuit diagram of a fluid pressure control device according to a modification of the embodiment of the present invention.
Figure 8:
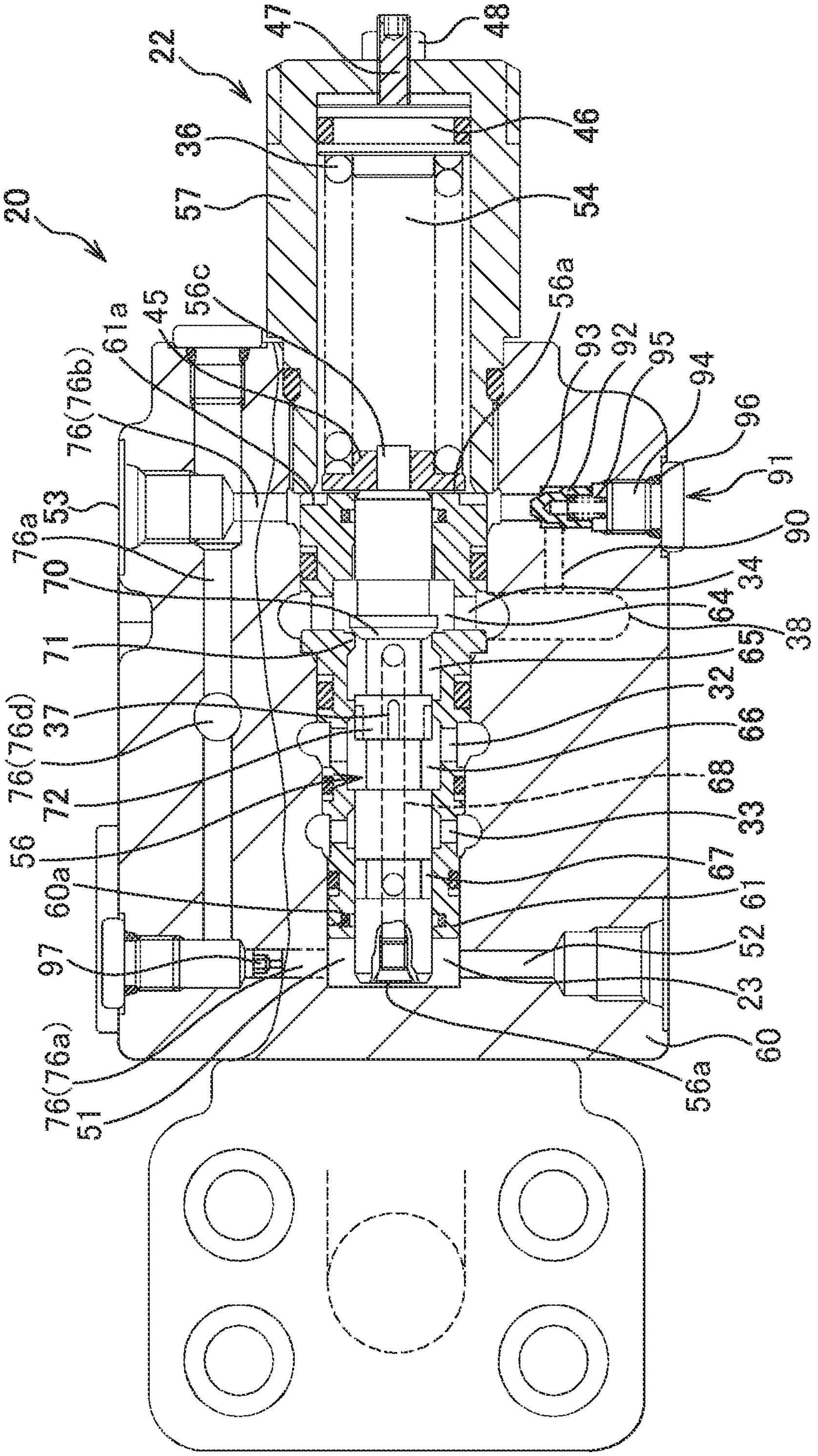
FIG. 8 is a cross-sectional view of a load holding mechanism of the fluid pressure control device according to the modification of the embodiment of the present invention.

(2) A modification of the above embodiment will be described with reference to FIGS. 7 and 8. FIG. 7 is a hydraulic circuit diagram of a hydraulic control device 101 according to the present modification, and FIG. 8 is a cross-sectional view of the load holding mechanism 20 of the hydraulic control device 101 according to the present modification. In FIGS. 7 and 8, components having the same functions as those in the above embodiment are denoted by the same reference numerals as those in the above embodiment, and description thereof will be omitted. In this modification, the piston 50 of the above embodiment is not provided, and the pilot chamber 23 and the drain chamber 51 are provided as a common space.

In the drain passage 76, an orifice 97 serving as a throttle that gives resistance to working oil passing therethrough is provided in a passage connecting the drain chamber 51 and the spring chamber 54. Specifically, in the present modification, the first drain passage 76*a* connected to the drain chamber 51 and the second drain passage 76*b* connected to the spring chamber 54 are connected, and the orifice 97 is provided in the passage where the first drain passage 76*a* and the second drain passage 76*b* are connected. Thus, when the working oil is led to the pilot chamber 23 through the pilot passage 52, pressure on an upstream side of the orifice 97 acts on the pilot chamber 23, and pressure on a downstream side of the orifice 97 acts on the drain chamber 51. Therefore, the spool 56 moves by the balance between the load due to differential pressure before and after the orifice 97 and biasing force of the spring 36.

In a state in which an operator operates the operation lever 10 to lead pilot pressure to the pilot chamber 23 and move the spool 56 in an opening direction such that the cylinder 2 is extended, when pressure in the rod-side chamber 2*a* increases and the relief valve 41 opens, relief pressure oil discharged from the relief valve 41 is led to the drain chamber 51 and the spring chamber 54. In the present modification, since the piston 50 is not provided, the relief pressure oil led to the drain chamber 51 does not cause a state in which thrust force of the spool 56 generated by the pilot pressure is reduced. However, since the relief pressure oil led to the spring chamber 54 applies force in a closing direction to the spool 56, the force in the closing direction acts on the spool 56 as in the above embodiment. Therefore, in the present modification as well, the pressure leading passage 90 and the check valve 91 exhibit the same effects as those of the above embodiment.

Figure 9:
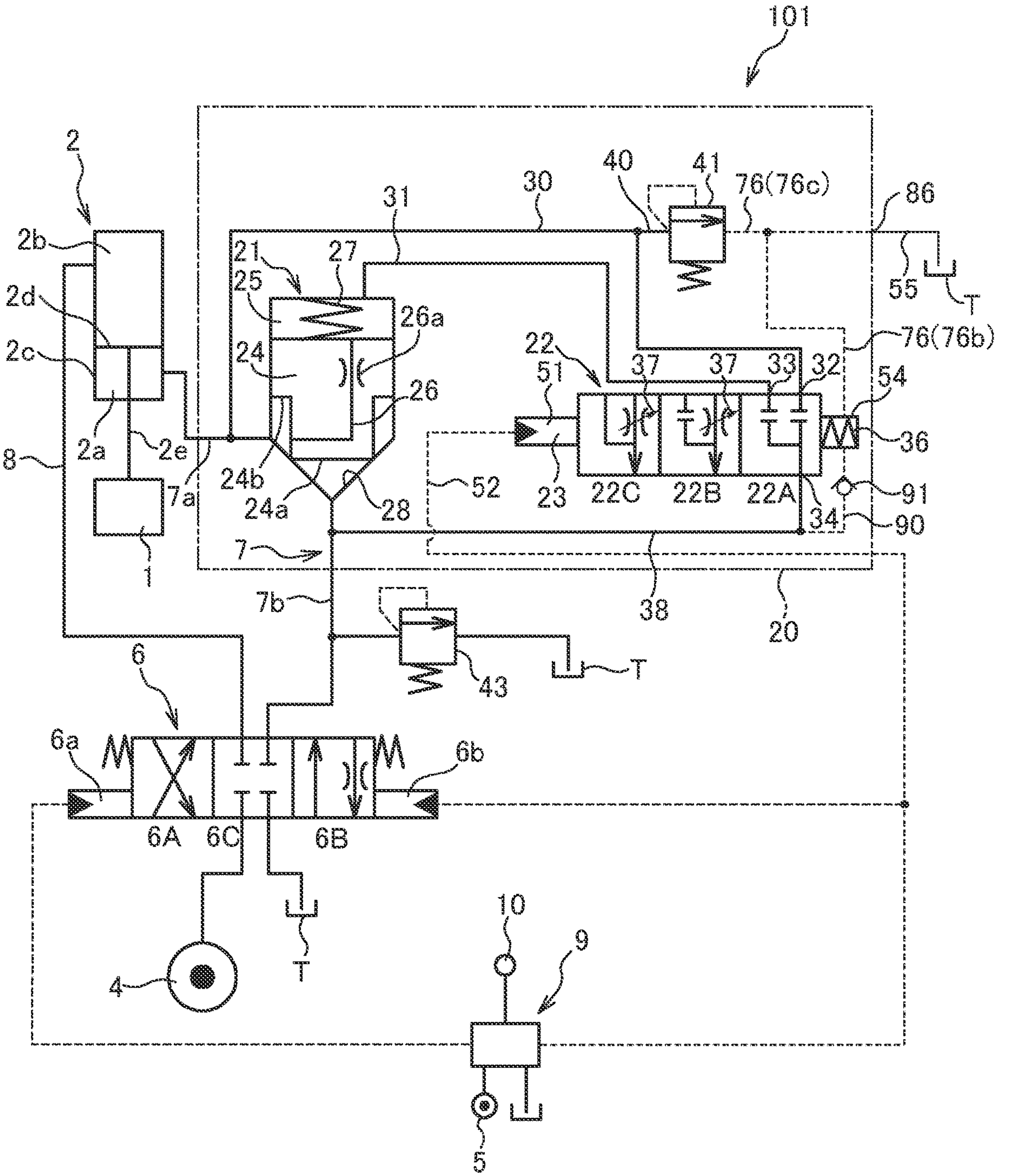
FIG. 9 is a fluid pressure circuit diagram showing a modification of the drain passage.

(3) FIG. 9 shows a modification of the embodiment shown in FIGS. 7 and 8. As shown in FIG. 9, the drain passage 76 may be configured such that the first drain passage 76*a* connected to the drain chamber 51 is not provided, and the third drain passage 76*c* connected to the relief valve 41 is connected to the second drain passage 76*b* connected to the spring chamber 54. In the present modification as well, the pressure leading passage 90 and the check valve 91 exhibit the same effects as those of the above embodiment.

Hereinafter, configurations, functions, and effects of the embodiments of the present invention will be collectively described.

The fluid pressure control device 100 for controlling an extending and contracting operation of the cylinder 2 that drives the load 1 includes the control valve 6 that controls the supply of a working fluid from the fluid pressure supply source 4 to the cylinder 2, the pilot control valve 9 that controls pilot pressure led from the pilot pressure supply source 5 to the control valve 6, the main passage 7*b* that connects the load-side pressure chamber 2*a* of the cylinder 2 and the control valve 6, load pressure by the load 1 acting on the load-side pressure chamber 2*a* when the control valve 6 is at the neutral position 6C, and the load holding mechanism 20 provided in the main passage 7*b*. The load holding mechanism 20 includes the operation check valve 21 that allows a flow of the working fluid from the control valve 6 to the load-side pressure chamber 2*a* and allows a flow of the working fluid from the load-side pressure chamber 2*a* to the control valve 6 in accordance with back pressure, the switching valve 22 that operates in conjunction with the control valve 6 by the pilot pressure led through the pilot control valve 9 to switch an operation of the operation check valve 21, and the relief valve 41 that opens when pressure in the load-side pressure chamber 2*a* reaches predetermined pressure. The switching valve 22 includes the pilot chamber 23 to which a pilot pressure is guided through the pilot control valve 9, the spool 56 that moves in accordance with the pilot pressure in the pilot chamber 23, the spring chamber 54 that accommodates the biasing member 36 that biases the spool 56 in a valve closing direction, the drain chamber 51 provided on an opposite side of the spring chamber 54 with the spool 56 interposed therebetween, the drain passage 76 connected to the relief valve 41 and connected to at least one of the drain chamber 51 and the spring chamber 54, the pressure leading passage 90 that connects the drain passage 76 and a downstream side of the spool 56, and the check valve 91 that is provided in the pressure leading passage 90 and allows only a flow of the working fluid from the drain passage 76 to the downstream side of the spool 56.

The switching valve 22 further includes the piston 50 that receives the pilot pressure on a back surface thereof and gives thrust force against biasing force of the biasing member 36 to the spool 56, and the drain chamber 51 is partitioned by the spool 56 and the piston 50.

The pilot chamber 23 and the drain chamber 51 are common, and among the drain passage 76, a passage connecting the drain chamber 51 and the spring chamber 54 is provided with the throttle 97 that gives resistance to the working fluid passing therethrough.

In these configurations, the check valve 91 that allows only the flow of the working fluid from the drain passage 76 to the downstream side of the spool 56 is provided in the pressure leading passage 90 that connects the drain passage 76 and the downstream side of the spool 56. Thus, when the relief valve 41 is opened while an operator is operating the cylinder 2 in a direction in which the load-side pressure chamber 2*a* is contracted by a lever operation, a relief fluid is led to the downstream side of the spool 56 through the pressure leading passage 90. Thus, rapid acceleration of the cylinder 2 can be prevented.

Embodiments of this invention were described above, but the above embodiments are merely examples of applications of this invention, and the technical scope of this invention is not limited to the specific constitutions of the above embodiments.

This application claims priority based on Japanese Patent Application No. 2021-130616 filed with the Japan Patent Office on Aug. 10, 2021, the entire contents of which are incorporated into this specification.

The invention claimed is:

1. A fluid pressure control device for controlling an extending and contracting operation of a cylinder that drives a load, the fluid pressure control device comprising:
- a supply control valve configured to control supply of a working fluid from a fluid pressure supply source to the cylinder;
- a pilot control valve configured to control pilot pressure led from a pilot pressure supply source to the supply control valve;
- a main passage configured to connect the supply control valve and a load-side pressure chamber of the cylinder on which load pressure of the load acts when the supply control valve is at a neutral position; and
- a load holding mechanism provided in the main passage, wherein
- the load holding mechanism includes:
  - an operation check valve configured to allow a flow of the working fluid from the supply control valve to the load-side pressure chamber and to allow a flow of the working fluid from the load-side pressure chamber to the supply control valve in accordance with back pressure,
  - a switching valve configured to operate in conjunction with the supply control valve by the pilot pressure led through the pilot control valve to switch an operation of the operation check valve, and
  - a relief valve configured to open when pressure in the load-side pressure chamber reaches predetermined pressure, and
- the switching valve includes:
  - a pilot chamber configured to receive the pilot pressure through the pilot control valve,
  - a spool configured to move in accordance with the pilot pressure in the pilot chamber,
  - a spring chamber configured to accommodate a biasing member that biases the spool in a valve closing direction,
  - a drain chamber provided on an opposite side of the spring chamber with the spool interposed therebetween,
  - a drain passage connected to the relief valve and connected to at least one of the drain chamber and the spring chamber,
  - a pressure leading passage configured to connect the drain passage and a downstream side of the spool, and
  - a check valve provided in the pressure leading passage and configured to allow only a flow of the working fluid from the drain passage to the downstream side of the spool.

2. The fluid pressure control device according to claim 1, wherein
- the switching valve further includes a piston configured to receive the pilot pressure on a back surface thereof and give thrust force against biasing force of the biasing member to the spool, and
- the drain chamber is partitioned by the spool and the piston.

3. A fluid pressure control device for controlling an extending and contracting operation of a cylinder that drives a load, the fluid pressure control device comprising:
- a supply control valve configured to control supply of a working fluid from a fluid pressure supply source to the cylinder;
- a pilot control valve configured to control pilot pressure led from a pilot pressure supply source to the supply control valve;
- a main passage configured to connect the supply control valve and a load-side pressure chamber of the cylinder on which load pressure of the load acts when the supply control valve is at a neutral position; and
- a load holding mechanism provided in the main passage, wherein
- the load holding mechanism includes:
  - an operation check valve configured to allow a flow of the working fluid from the supply control valve to the load-side pressure chamber and to allow a flow of the working fluid from the load-side pressure chamber to the supply control valve in accordance with back pressure,
  - a switching valve configured to operate in conjunction with the supply control valve by the pilot pressure led through the pilot control valve to switch an operation of the operation check valve, and
  - a relief valve configured to open when pressure in the load-side pressure chamber reaches predetermined pressure, and
- the switching valve includes:
  - a pilot chamber configured to receive the pilot pressure through the pilot control valve,
  - a spool configured to move in accordance with the pilot pressure in the pilot chamber,
  - a spring chamber configured to accommodate a biasing member that biases the spool in a valve closing direction,
  - a drain chamber provided on an opposite side of the spring chamber with the spool interposed therebetween,
  - a drain passage connected to the relief valve, and connecting the drain chamber to the spring chamber,
  - a pressure leading passage configured to connect the drain passage and a downstream side of the spool, and
  - a check valve provided in the pressure leading passage and configured to allow only a flow of the working fluid from the drain passage to the downstream side of the spool,
- the pilot chamber and the drain chamber are provided as a common space, and the drain passage includes a throttle at a portion of the drain passage that connects the drain chamber to the spring chamber, the throttle giving a resistance to the working fluid passing therethrough.

* * * * *